(12) United States Patent
El-Refaie et al.

(10) Patent No.: US 8,222,787 B2
(45) Date of Patent: Jul. 17, 2012

(54) ELECTRIC MACHINE

(75) Inventors: Ayman Mohamed Fawzi El-Refaie, Niskayuna, NY (US); Patel Bhageerath Reddy, Madison, WI (US)

(73) Assignee: General Electric Company, Niskayuna, NY (US)

( * ) Notice: Subject to any disclaimer, the term of this patent is extended or adjusted under 35 U.S.C. 154(b) by 124 days.

(21) Appl. No.: 12/416,220

(22) Filed: Apr. 1, 2009

(65) Prior Publication Data
US 2010/0253171 A1 Oct. 7, 2010

(51) Int. Cl.
| H02K 1/00 | (2006.01) |
| H02K 3/00 | (2006.01) |
| H02K 19/26 | (2006.01) |
| H02K 21/00 | (2006.01) |
| H02K 21/12 | (2006.01) |
| H02K 23/02 | (2006.01) |

(52) U.S. Cl. ......... 310/156.53; 310/156.23; 310/156.43; 310/156.56; 310/156.83; 310/154.21

(58) Field of Classification Search ............. 310/156.23, 310/156.53, 154.21, 52, 54, 156.43, 156.83, 310/156.56; H02K 21/12, 1/00, 3/00, 19/26, H02K 21/00, 23/02
See application file for complete search history.

(56) References Cited

U.S. PATENT DOCUMENTS

| 4,405,873 | A | * | 9/1983 | Nondahl | 310/156.56 |
| 5,684,352 | A | * | 11/1997 | Mita et al. | 310/156.56 |
| 6,472,789 | B1 | * | 10/2002 | Akemakou | 310/156.57 |
| 6,684,483 | B2 | | 2/2004 | Rahman et al. | |
| 6,703,746 | B2 | * | 3/2004 | Biais et al. | 310/156.53 |
| 6,889,419 | B2 | | 5/2005 | Reiter, Jr. et al. | |
| 6,972,504 | B1 | * | 12/2005 | Hsu | 310/156.56 |
| 7,051,421 | B2 | * | 5/2006 | Biais et al. | 29/596 |
| 7,504,754 | B2 | * | 3/2009 | Jahns et al. | 310/156.53 |
| 2002/0041128 | A1 | * | 4/2002 | Nishiyama et al. | 310/156.53 |
| 2002/0121827 | A1 | * | 9/2002 | Kaneko et al. | 310/156.43 |
| 2003/0062792 | A1 | | 4/2003 | Reiter, Jr. et al. | |
| 2003/0063993 | A1 | | 4/2003 | Reiter, Jr. et al. | |
| 2004/0000359 | A1 | * | 1/2004 | Tayu et al. | 148/302 |
| 2004/0095033 | A1 | * | 5/2004 | Popov | 310/156.55 |
| 2004/0212266 | A1 | * | 10/2004 | Hans | 310/156.56 |
| 2004/0217667 | A1 | * | 11/2004 | Popov | 310/156.57 |
| 2005/0001503 | A1 | * | 1/2005 | Hans | 310/156.53 |
| 2006/0170301 | A1 | * | 8/2006 | Masuzawa et al. | 310/156.53 |
| 2006/0238282 | A1 | * | 10/2006 | Komuro et al. | 335/209 |
| 2006/0290222 | A1 | * | 12/2006 | Shen et al. | 310/156.56 |
| 2007/0017601 | A1 | * | 1/2007 | Miyata et al. | 148/105 |
| 2007/0096578 | A1 | * | 5/2007 | Jahns et al. | 310/156.53 |
| 2007/0228862 | A1 | * | 10/2007 | Welchko et al. | 310/156.53 |
| 2007/0284960 | A1 | * | 12/2007 | Fulton et al. | 310/156.53 |
| 2010/0253169 | A1 | * | 10/2010 | El-Refaie et al. | 310/156.01 |

(Continued)

OTHER PUBLICATIONS

Nasar et al, "Permanent Magnet, Reluctance, and Synchronous Motors", CRC Press, 1993.*

(Continued)

*Primary Examiner* — John K Kim
(74) *Attorney, Agent, or Firm* — Jason K. Klindtworth

(57) ABSTRACT

An interior permanent magnet electric machine is disclosed. The interior permanent magnet electric machine comprises a rotor comprising a plurality of radially placed magnets each having a proximal end and a distal end, wherein each magnet comprises a plurality of magnetic segments and at least one magnetic segment towards the distal end comprises a high resistivity magnetic material.

15 Claims, 6 Drawing Sheets

U.S. PATENT DOCUMENTS

2010/0253171 A1* 10/2010 El-Refaie et al. ........ 310/156.53

OTHER PUBLICATIONS

Catalog "Neomax", Hitachi Metals America Ltd, 1994, 2011.*

R.H. Staunton, S.C. Nelson, P.J. Otaduy, J.M. McKeever, J.M. Bailey, S. Das, R.L. Smith; PM Motor Parametric Design Analyses for a Hybrid Electric Vehicle Traction Drive Application; Sep. 2004; pp. 1-109; Prepared by the Oak Ridge National Laboratory Oak Ridge, Tennessee 37831.

Byoung-Kuk Lee, Gyu-Hong Kang, Jin Hur, Dong-Wook You; Design of Spoke Type BLDC Motors with High Power Density for Traction Applications; IAS 2004; pp. 1068-1074.

Ki-Chan Kim, Ju Lee; The Dynamic Analysis of a Spoke-Type Permanent Magnet Generator With Large Overhang, IEEE Transactions on Magnetics, vol. 41, No. 10, Oct. 2005; pp. 3805-3807.

* cited by examiner

500

| Position of segment from circumference 401 (502) | Reference Numeral (504) | Eddy current loss within segment (Watts) (506) |
|---|---|---|
| 1 | 408 | 212 |
| 2 | 410 | 36 |
| 3 | 412 | 7 |
| 4 | 414 | 2.6 |
| 5 | 416 | 1.7 |
| 6 | 418 | 1.58 |
| 7 | 420 | 1.56 |
| 8 | 422 | 1.55 |
| 9 | 424 | 1.55 |
| 10 | 426 | 1.55 |
| 11 | 428 | 1.55 |
| 12 | 430 | 1.58 |

FIG. 5

ELECTRIC MACHINE

STATEMENT REGARDING FEDERALLY SPONSORED RESEARCH & DEVELOPMENT

This invention was made with Government support under contract number DE-FC26-07NT43122 awarded by The United States Department of Energy. The Government has certain rights in the invention.

BACKGROUND

The invention relates generally to electro-mechanical machines, and more specifically to interior permanent magnet electrical machines.

Environmental considerations are a primary reason for developing fuel efficient machines. For example, in the automobile industry, there is a current move towards developing hybrid automobiles (that is, automobiles having more than one source of power, such as for instance, diesel and electric), as these have been shown to be more fuel efficient than conventional fossil fuel powered automobiles.

The thrust to develop high-efficiency electrical machines, for instance, for use in hybrid automobiles, will have to be tempered with a cost of manufacturing such electrical machines. Any electrical machine technology that achieves energy efficiency at an undue manufacturing cost will likely not be commercially viable.

Current challenges facing development of cost effective electrical machines for hybrid automobiles are related to power density and efficiency considerations. Current electrical machine technologies suffer from high rotor magnet losses due to their winding structures and high speeds. Attempts to design efficient rotors to mitigate the above losses often result in an increase in complexity of their design, which in turn, makes electrical machines incorporating such designs commercially unattractive.

An electrical machine having a level of efficiency that is enhanced over currently available electrical machines and that can be manufactured in a cost-efficient manner would be highly desirable.

BRIEF DESCRIPTION

Embodiments of the invention are directed towards an electric machine. More specifically, embodiments of the invention are directed towards permanent magnet electric machines.

An interior permanent magnet electric machine, the machine comprising a rotor comprising a plurality of radially placed magnets each having a proximal end and a distal end, wherein each magnet comprises a plurality of magnetic segments and at least one magnetic segment towards the distal end comprises a high resistivity magnetic material.

A method for making an interior permanent magnet machine, the method comprising providing a rotor comprising a plurality of radially placed magnets each having a proximal end and a distal end, wherein each magnet comprises a plurality of magnetic segments and at least one magnetic segment towards the distal end comprises a high resistivity magnetic material.

An interior permanent magnet machine, the machine comprising a rotor comprising a plurality of radially placed magnets each having a proximal end and a distal end, wherein each magnet comprises a plurality of magnetic segments and at least one magnetic segment towards the distal end comprises a high resistivity magnetic material, and a stator, wherein a magnetic flux field produced within the stator due to the plurality of magnets, is bidirectional.

These and other advantages and features will be more readily understood from the following detailed description of preferred embodiments of the invention that is provided in connection with the accompanying drawings.

DRAWINGS

FIG. 5 is a tabular representation of a finite element modeling study of eddy current losses within segments of a segmented permanent magnet, in accordance with one embodiment of the invention.

DETAILED DESCRIPTION

Figure 1:
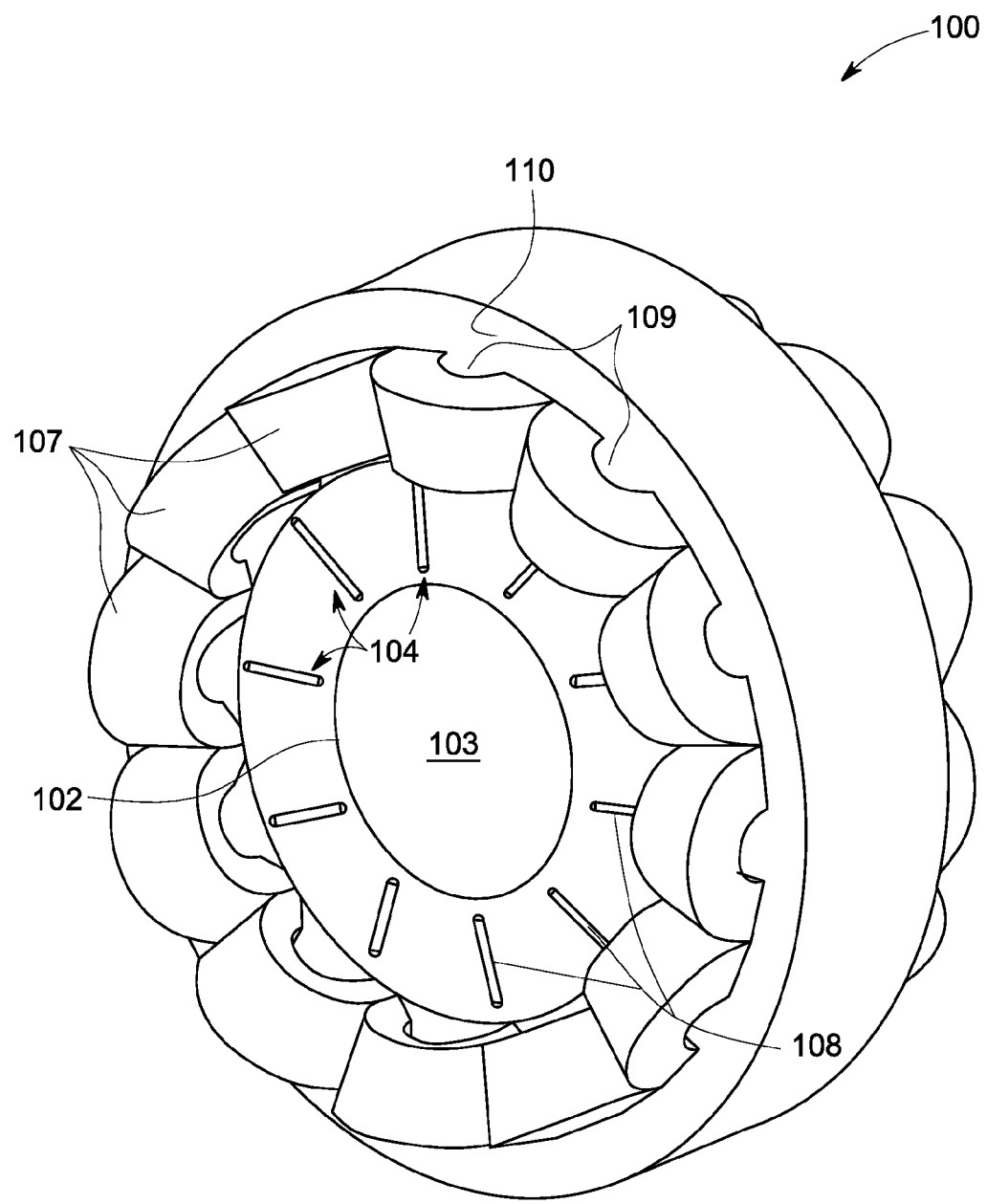
FIG. 1 is a perspective view of a prior art interior permanent magnet electrical machine.

In the following description, whenever a particular aspect or feature of an embodiment of the invention is said to comprise or consist of at least one element of a group and combinations thereof, it is understood that the aspect or feature may comprise or consist of any of the elements of the group, either individually or in combination with any of the other elements of that group.

In the following specification and the claims that follow, the singular forms "a," "an," and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about" or "substantially," may not be limited to the precise value specified, and may include values that differ from the specified value. In at least some instances, the approximating language may correspond to the precision of an instrument for measuring the value.

As used herein, the term "adjacent," when used in context of discussion of different entities comprising, for instance, a permanent magnet electric machine, may refer to the situation where the entities under discussion are disposed immediately next to each other, that is, are contiguous, or it may also refer to a situation wherein intervening entities are disposed between the entities under discussion, that is, the entities under discussion are non-contiguous.

As used herein, the terms "electric machine," and "electrical machine" may sometimes be used interchangeably.

As used herein, the term "within," when used in context of discussion of any physical entity may refer to a bulk of the physical entity or it may refer to a surface of the physical entity, or it may refer to both the bulk and the surface of the physical entity.

In the present discussions it is to be understood that, unless explicitly stated otherwise, any range of numbers stated during a discussion of any region within, or physical characteristic of, for instance, an interior permanent magnet electrical machine, is inclusive of the stated end points of the range.

In the present discussions, it is understood, as is the practice within the art, that the term, "sintered magnets" refers to a class of magnets having high remanance, high energy product, and high coercivity. For instance, it is known in the art, that values of energy product of sintered magnets are typically in excess of 20 megaGauss Oersteds (MGOe), and can reach up to 50 MGOe. On the other hand, the class of magnets referred to as "bonded magnets" within the art, have lower energy product values that are typically lower than 20 MGOe. Bonded magnets are fabricated from powders of cast or heat-treated rare earth material alloys such as neodymium iron boron (NdFeB), or samarium cobalt (SmCo), by introduction of additives including highly coercive powders. A resistivity of bonded magnets typically lies within a range of about 16-20 microohm meters. This is to be compared with a resistivity of sintered magnets that typically lies within a range of about 1.2-1.6 microohm meters.

Electric machines convert electrical energy into mechanical motion and vice versa. Electric machines typically consist of a stator that produces a rotating field when excited by alternating multi-phase current and a rotor (which produces a rotating field), and operate through an interaction of magnetic flux and electric current to produce rotational speed and torque. The considerations related to design and purpose of the stator, and of the rotor, are well known in the art. For instance, one of the key considerations concerns eddy current losses within the stator and rotor during operation of the electrical machine. To reduce eddy current losses, the rotors and stators have traditionally been fabricated out of thin laminations. Non-limiting examples of materials from which the laminations may be fabricated include silicon steel.

A traditional approach to further reduce eddy current losses has included fabricating the stator and/or the rotor from thin laminations, hence reducing a machine stacking factor. However, this approach has a disadvantage in that it results in an increase in the size of the electrical machine. Therefore, this approach has only limited feasibility in mitigating eddy current losses within electric machines. Furthermore, it is noted that an ability to use low loss lamination materials is limited by the cost of the materials.

The need for low cost, high performance, and high efficiency electrical machines is self-evident. A non-limiting example of the use of electrical machines is in traction applications. Operation at high speeds is a typical feature that results in electrical machines delivering enhanced "high" levels of performance. Embodiments of the invention disclosed herein include an internal permanent magnet machine that delivers enhanced performance at a lower cost than currently available electrical machines.

As is known in the art, for high-speed applications, enhanced operational electrical excitation frequencies are needed. It is also known in the art that eddy current losses in the stator and rotor increase with an increase in operational electrical excitation frequency. The eddy current losses in electrical machines can therefore be significant in high-speed applications.

As mentioned, high-speed electrical machines can achieve high levels of operational performance. One of the key challenges of high-speed operation of such electrical machines is the eddy current losses in the rotor. Efficient high-speed machines can be achieved if a mechanism to reduce the inevitable eddy current losses can be devised. It is evident that, for such an enhanced performance electrical machine to be commercially viable, the mechanism must be cost-effective. Further, it will be appreciated that the considerations related to the design of such a mechanism will involve at least structural and material aspects.

Embodiments of the invention disclosed herein propose a low cost and low rotor loss hybrid interior permanent magnet (HIPM) electric machine, the rotor of which includes segmented magnets that include, for example, bonded and sintered magnets. The electrical machine is referred to as "hybrid" because it includes magnets of differing kinds, for instance, bonded magnets and sintered magnets. The bonded magnets can be composed of any suitable materials (discussed below) and can be in any suitable form. Non-limiting examples of forms of the magnetic material include nanostructured materials. The sintered magnets can be composed of any suitable materials (discussed below) and can be in any suitable form. Non-limiting examples of forms of the magnetic material (bonded or sintered) include nanostructured materials.

Embodiments of the HIPM electric machine disclosed herein can function as a high-speed electric machine. For a given power rating, this may allow one to reduce the size of an electric machine. This in turn may result in an increased power density (that is, a power output per unit volume of the electrical machine) within the electric machine, which in turn may result in an enhanced performance of the electric machine. An operational cost of such an enhanced performance IPM electric machine is likely less than the operational cost of electric machines that are currently available. In one embodiment, the HIPM includes a multi-phase machine, such as a three-phase machine.

In a typical prior art electrical machine 100 shown in a perspective view in FIG. 1, a generally cylindrical rotor 102 comprises a plurality of rotor poles 104, the individual poles of which are generally circumferentially disposed within the rotor 102. A generally cylindrical shaft 103 is defined as a generally centrally disposed opening within the rotor 102. The plurality of poles 104 may comprise a plurality of permanent magnets 108. Disposed circumferentially enclosing the rotor 102 is a generally cylindrical stator 110. The stator has a plurality of stator teeth 109 facing the plurality of rotor poles 104 and a plurality of slots (not indicated). Each of the plurality of stator teeth 109 are wound with coils of wire 107 such that supplying electric current to the coils causes a production of a rotating magnetic field. This rotating magnetic field interacts with a magnetic field on the rotor 102 side and motivates the rotor 102 to rotate. That is, electromagnetic energy supplied to the coils is converted to mechanical motion which in turn produces torque.

Figure 2:
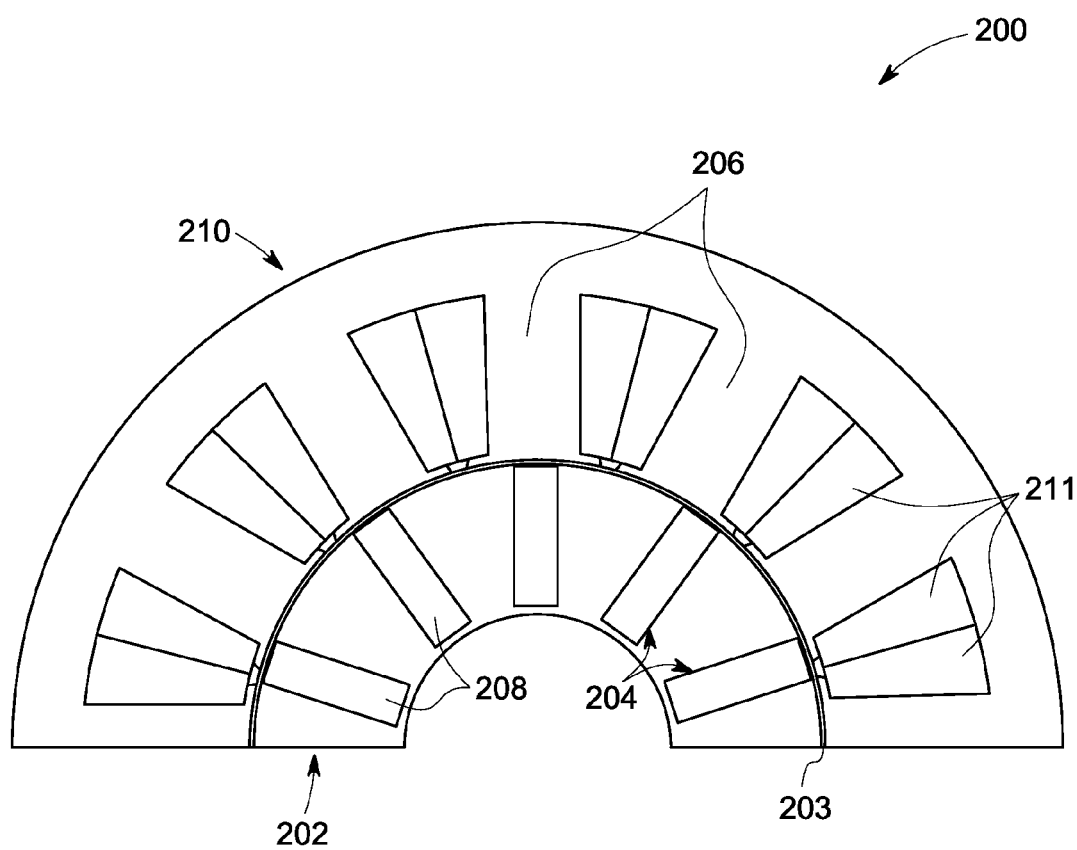
FIG. 2 is a schematic view of a prior art interior permanent magnet electrical machine.

In a typical prior art electrical machine 200 shown schematically in FIG. 2, a generally cylindrical rotor 202 comprises a plurality of rotor poles 204, the individual poles of which are generally circumferentially disposed within the rotor 202. A plurality of permanent magnets 208 are disposed within the plurality of rotor poles 204. Each of the plurality of permanent magnets 208 may be segmented (not depicted). Quite generally, each of the plurality of magnets 208 may be said to define a corresponding pole of the plurality of rotor poles 204. In the discussions herein, therefore, the phrases, "plurality of rotor poles," and "plurality of permanent magnets," may sometimes be used interchangeably. Therefore, as with the plurality of poles 204, the plurality of permanent magnets 208, may also be considered to be included within the rotor 202. Disposed circumferentially enclosing the rotor 202 is a generally cylindrical stator 210. An air gap 203 separates the rotor 202 and the stator 210. The stator has a plurality of stator teeth 206 facing the plurality of rotor poles 204, and a plurality of stator slots 211. Each of the plurality of stator teeth 206 are wound with coils of wire (not shown) such that supplying electric current to the coils causes a production of a rotating magnetic field. This rotating magnetic field interacts with a magnetic field on the rotor 202 side and motivates the rotor 202 to rotate. That is, electromagnetic energy supplied to the coils is converted to mechanical motion which in turn produces torque.

Electrical machines including permanent magnets may be considered as magnetic circuits. The magnetic circuit defined by an electrical machine may then include, a rotor (for example, of type 202) including a plurality of rotor poles (for example, of type 204), a plurality of permanent magnets (for instance, of type 208), a stator (for example, of type 210) including a plurality of stator teeth (for example, of type 206), a plurality of stator slots (for example, of type 211), and an air gap between the rotor and the stator (for example, of type 203). At any instant during rotation of the rotor, the magnetic circuit will have a reluctance. The reluctances of the magnetic circuits is a function of, for example, a number of the rotor transitions, from being opposite a stator tooth to being opposite a stator slot. A reluctance torque is generated due to changes in reluctance of magnetic circuits in the electrical machine due to the rotation of the rotor. The generated reluctance torque is a factor governing the electrical efficiency of the electrical machine. As is known in the art, for the same net torque, higher reluctance torque results in a reduction in required permanent magnet torque. The reduction in permanent magnet torque in turn results in a reduction in the required permanent magnet content within the electrical machine. The reduction in permanent magnet content in turn results in a reduction in the cost of the electrical machine.

The plurality of rotor poles 204 may be considered to "house" the plurality of permanent magnets 208. The plurality of permanent magnets 208 are subjected to the eddy current losses that are present within the rotor 202 due to the asynchronous rotating fields from the stator 210 side. The eddy current losses within the rotor 202 in turn contribute to a decrease in the overall efficiency of the electric machine 200. Therefore, an understanding of the spatial distribution, and corresponding magnitude of the eddy current losses within the plurality of permanent magnets 208 is required for mitigation of eddy current losses within the rotor 202.

Figure 3:
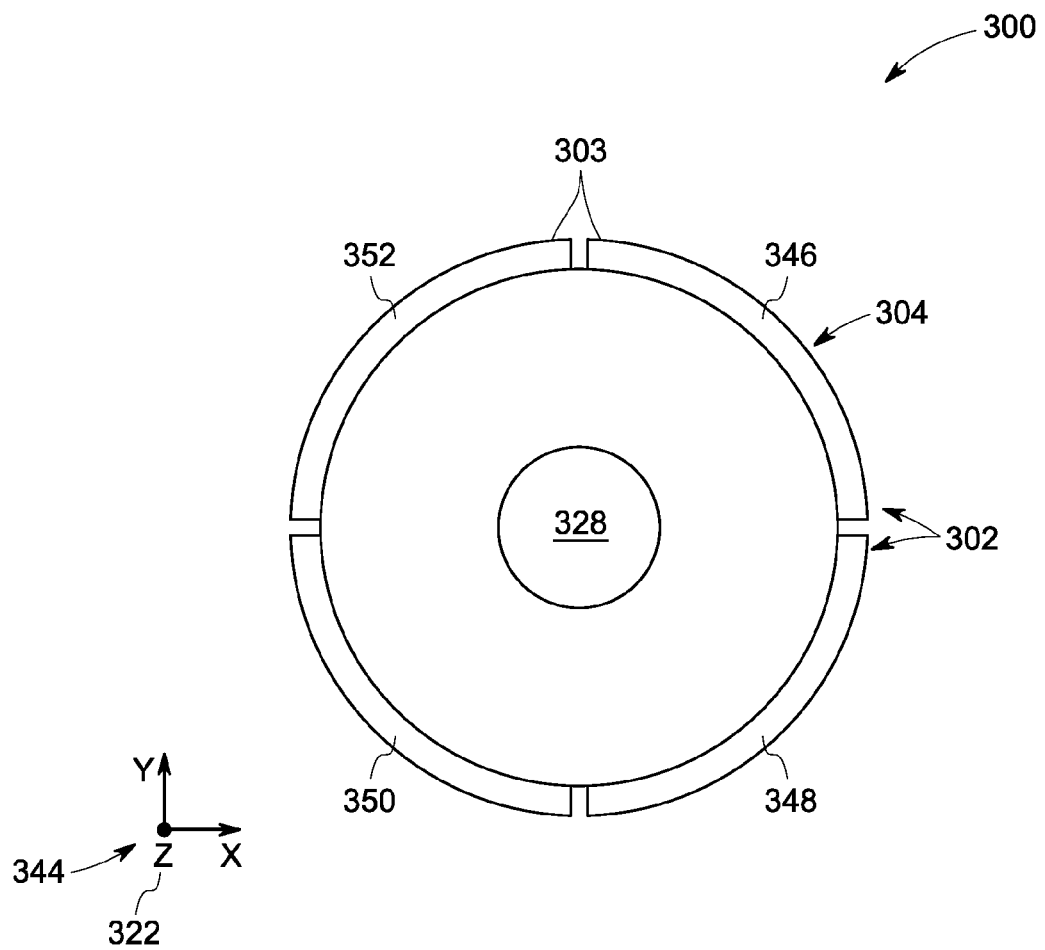
FIG. 3 is a schematic view of a prior art surface permanent magnet electrical machine.

Typical prior art electrical machines also include surface permanent magnet electrical machines, such as the surface permanent magnet electrical machine 300 shown schematically in FIG. 3. According to the embodiment 300, a plurality of poles 302 are disposed on the surface of the rotor 304. In the embodiment shown in FIG. 3, the plurality of poles 302 include a plurality of permanent magnets 303 such as the permanent magnets 346, 348, 350, and 352. A generally cylindrical shaft 328 is defined as a generally centrally disposed opening within the rotor 304. According to the embodiment 300, the plurality of poles 302 include a plurality of hard magnets. Those skilled in the art would appreciate that the rotor 304 may be fabricated from a plurality of rotor laminations (not shown) stacked together along a thickness direction 322 (z-direction of the right hand cartesian coordinate system 344) of the rotor 304.

As discussed herein, the rotor of an electrical machine is traditionally fabricated in the form of thin laminations to reduce eddy current losses. Quite generally, the rotor also includes a plurality of poles. The plurality of poles in turn include a plurality of permanent magnets. Indeed, as discussed herein, the plurality of permanent magnets may be considered to define the plurality of poles. These permanent magnets, being electrically conductive, support eddy currents, and therefore are also a seat of eddy current losses. According to an embodiment of the invention, an HIPM electric machine 400, shown for instance in FIG. 4, includes a rotor 402 that includes a plurality of rotor poles 403, the individual poles of which are generally circumferentially disposed within the rotor 402, a plurality of permanent magnets 404, wherein each of the plurality of permanent magnets 404 has been fabricated out of a plurality of permanent magnet segments 406. The individual poles of the plurality of rotor poles 403 are generally radially disposed. Similarly therefore, as per the discussions herein, the plurality of permanent magnets 404 are also generally radially disposed. According to an embodiment of the HIPM machine disclosed herein, an electrical insulation 462 may be disposed between any two adjacent permanent magnet segments belong to the plurality of permanent magnet segments 406. Such a plurality of "segmented permanent magnets" 404 including electrical insulation between any two adjacently disposed permanent magnet segments belonging to the plurality of permanent magnet segments 406 present a reduced path length over which eddy currents can travel, thereby resulting in a reduction of the contribution from the induced "permanent magnet eddy current losses" to the total eddy current loss within the rotor 402 or more generally within the HIPM electric machine 400. Further, the HIPM electrical machine 400 shown in FIG. 4 includes an air gap 464 that separates the rotor 402 from a stator 407 having a plurality of stator teeth 405 and a plurality of stator slots 411.

The above feature of the electrical machine 400, wherein each of the plurality of permanent magnets 404 is fabricated from a plurality of permanent magnet segments of type 406, results in a reduction of eddy current losses as compared, for instance, to the electrical machine 200. This in turn results in an enhancement of the efficiency of the HIPM electric machine 400 over the prior art electrical machine 200. Any scheme to further mitigate eddy current losses within the plurality of permanent magnets 404, to be commercially viable, must not adversely affect torque production ability of the electric machine 400. As discussed herein, sintered magnets typically have higher energy products as compared to bonded magnets. Electrical machines that employ sintered magnets therefore, typically display higher levels of machine torque and higher levels of power density as compared to electrical machines that employ bonded magnets. The electrical resistivity of sintered magnets however, being typically lower than the electrical resistivity of bonded magnets, results in sintered magnets displaying eddy current losses that are higher as compared to the eddy current losses displayed by bonded magnets. Additionally, because sintered magnets have an energy product that is higher than bonded magnets, embodiments of the electrical machine 400 wherein each of the plurality of permanent magnets 404 include only sintered magnets, have a higher energy density as compared to embodiments of the electrical machine 400, wherein the each of the plurality of permanent magnets 404 include only bonded magnets. Again, because sintered magnets have an energy product that is higher than bonded magnets, embodiments of the electrical machine 400 wherein the each of the plurality of permanent magnets 404 include only sintered magnets, have a higher torque production capability as compared to embodiments of the electrical machine 400, wherein the each of the plurality of permanent magnets 404 include only bonded magnets. Embodiments of the electrical machine 400, wherein some of the segments of the plurality of segments 406 of any one or more of the plurality of permanent magnets 404 include both sintered and bonded magnets will have a torque production capability that lies between the torque production capability of embodiments of electrical machine 400 that include only sintered magnets and embodiments of electrical machine 400 that include only bonded magnets.

Figure 4:
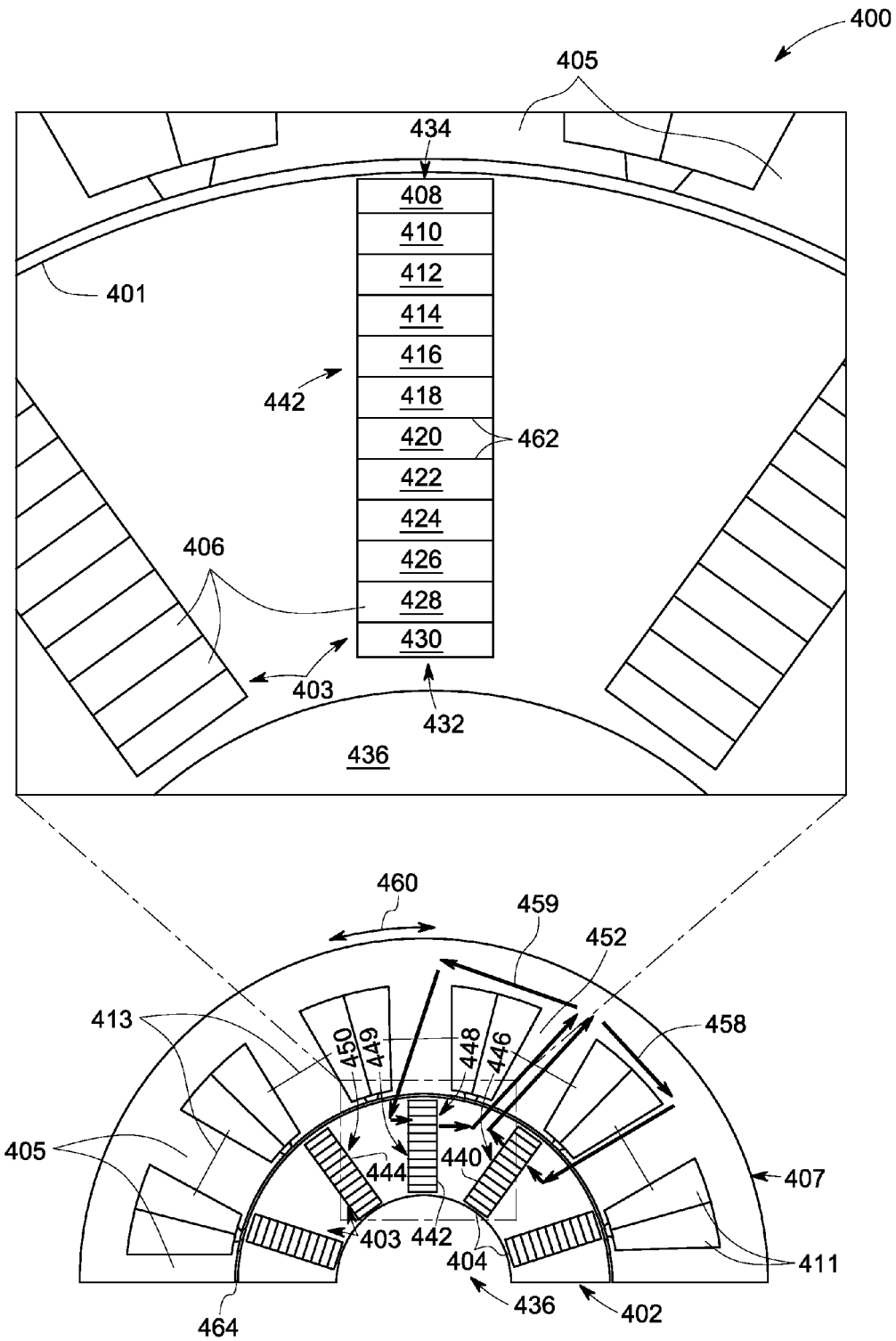
FIG. 4 is a schematic view of an interior permanent magnet electrical machine in accordance with one embodiment of the invention.

Referring again to FIG. 4, as discussed herein, individual permanent magnet segments of the plurality of permanent magnet segments 406 will each be a seat of a certain amount of eddy current loss. For instance, consider as a non-limiting example, the HIPM electric machine 400 including the rotor 402, the plurality of rotor poles 403 including a plurality permanent magnets 404 that are segmented, wherein, each of the permanent magnets includes or is fabricated out of, for instance, twelve permanent magnet segments. The twelve permanent magnet segments are labeled via reference numerals 408, 410, 412 . . . 430. As illustrated in FIG. 4, the permanent magnet segment 408 is disposed closest to the circumference 401 of the rotor 402, and the permanent magnet segment 430 is disposed so that it is closest to the shaft 436. One may estimate the eddy current loss within each of the permanent magnet segments 408, 410, 412 . . . 430, via, for instance, a finite element modeling study. Such a study can provide information about the spatial distribution of eddy current losses within the plurality of permanent magnets 404. One example of such a study is presented in tabular form in FIG. 5.

FIG. 5 presents, in tabular form 500, the results of an exemplary finite element modeling study of the eddy current loss within one of the plurality of permanent magnets 404, for example, permanent magnet 442. The estimates of the eddy current loss within each of the permanent magnet segments are presented in table 500. The electric machine 400, being substantially radially symmetrical, the results of such a study, when performed for the other permanent magnets of the plurality of permanent magnets 404, would substantially be similar to the results presented in table 500. Column 502 lists the contiguously placed individual permanent magnet segments for the permanent magnet 442, with reference numerals 408, 410, 412 . . . 430 (listed in column 504), as per their locations at increasing distances from the rotor circumference 401, column 504 lists the reference numeral associated with a particular segment, and column 506 lists the estimated eddy current losses within the individual permanent magnet segments 408-430 of permanent magnet 442. A simplified mathematical expression that relates eddy current loss "E" of a permanent magnet segment to a electrical resistance "R" of a permanent magnet segment is given as, $$E \propto \frac{1}{R} \quad (1)$$

It is evident from expression (1) that, since E and R are inversely related, a change by, for instance, a factor of "N" in R would result in a change of "1/N" in E. For example, if R increases by a factor of N, then E would decrease by a factor of N.

It may be evident from a perusal of columns 502 and 506, that eddy current losses in the permanent magnet segments closer to the rotor circumference 401 make a substantial contribution to the total eddy current losses due and within the plurality of permanent magnets 404. For instance, with respect to the rotor circumference 401, the first permanent magnet segment 408 (which is disposed close to a distal end 434 of the permanent magnet 442) has an eddy current loss of about 212 Joules, while the second permanent magnet segment 410 has an eddy current loss of about 36 Joules, and the third permanent magnet segment 412 has an eddy current loss of about 7 Joules. Together, these three segments, by themselves, account for more than 90% of the total eddy current loss of about 270 Joules (sum of eddy current losses listed in column 506) within the permanent magnet 442. Based on this study therefore, an effective strategy to mitigate eddy current losses within the rotor 402 would target to reduce the eddy current loss within the permanent magnet segments that are closer to the circumference 401.

In accordance with one embodiment of the invention therefore, an electrical machine (for instance, of type 400) is provided, wherein the electrical machine includes a rotor (for instance, of type 402) comprising a plurality of radially placed permanent magnets (for instance, of type 404), wherein each of the plurality of permanent magnets has a proximal end and a distal end, and wherein each of the plurality of permanent magnets includes a plurality of permanent magnet segments (for instance, of type 406), and wherein at least one permanent magnet segment towards the distal end (of the corresponding permanent magnet) includes a high resistivity permanent magnetic material. Furthermore, in the present example of the permanent magnet 442, the proximal end refers to that end 432 of the permanent magnet 442 that is closest to the shaft 436, while the distal end refers to the end of the permanent magnet that is closest to the circumference 401. Non-limiting examples of permanent magnet materials include, bonded magnets or sintered magnets. According to one embodiment of the HIPM electrical machine 400, the bonded magnets have an electrical resistivity of up to about 20 microohm meters. According to one embodiment of the HIPM electrical machine 400, the sintered magnets have an electrical resistivity that lies within a range from about 1.2 microohm meters to about 1.6 microohm meters.

An appropriate radial placement "spoke" configuration of the plurality of permanent magnets 404 results in a flux concentration effect within the air gap 464, which in turn results in an enhancement in the torque production capability of the electrical machine 400. The flux concentration effect can be understood as discussed below.

Consider, for instance, specifically the permanent magnets labeled via reference numerals 440, 442, and 444 in FIG. 4. The permanent magnets 440, 442, and 444 are arranged so that the faces facing each other constitute independently the same magnetic pole. For instance, in the embodiment 400, faces 446 and 448, of permanent magnets 440 and 442 are both magnetic north poles. The face 449 of permanent magnet 442 is therefore a south pole, and hence permanent magnet 444 is placed so that its face 450 is a south pole. It is evident that magnetic flux 458 emanating from face 446, and magnetic flux 459 emanating from face 448 are both driven, via the air gap 464 substantially into the same rotor pole 452. In other words, the radial arrangement of permanent magnets as described results in a concentration of magnetic flux within the rotor poles. It is evident that the plurality of permanent magnets 404 establish a magnetic flux (for instance, of type 458) field in a substantially circumferential direction 460 of the rotor 402.

In one embodiment, the electrical machine may have a stator 407 including a plurality of segmented structures (not shown for clarity), a plurality of stator slots 411, and a plurality of fractional slot concentrated electrical windings 413, wherein each electrical winding of the plurality of fractional slot concentrated electrical windings 413 are individually wound around a tooth belonging to a plurality of stator teeth 405. The use of fractional slot concentrated electrical windings together with a segmented stator structure helps reduce material and manufacturing cost of the electrical machine 400. This is due to the fact that fractional slot concentrated electrical windings result in an enhanced slot fill factor as a well as a reduction of electrical winding material (usually copper) that is required in the end turns of the electrical windings. On the other hand, fractional slot concentrated electrical windings also result in enhanced levels of a space harmonic content within the electrical machine 400. During operation of the electrical machine 400, when the plurality of fractional slot concentrated electrical windings 413 are excited via alternating multi-phase currents, components of the space harmonic content generate rotating fields in the air gap 464. The rotating magnetic fields are typically not in synchronism with the rotation of the rotor 402, and therefore induce eddy currents losses within the rotor 402, and the plurality of permanent magnets 404.

As is known in the art, and as discussed herein, fabricating each of the plurality of permanent magnets 404 individually from a plurality of permanent magnet segments of type 406 results in a decrease in eddy current losses within the plurality of permanent magnets 404 and more generally within the rotor 402. Embodiments of the invention proposed herein, include a plurality of permanent magnets 404, wherein at least one of the plurality of permanent magnets 404 includes a plurality of segments (of type 406) and wherein at least one of the segments of the plurality of segments includes a high resistivity permanent magnet such as a bonded magnet. As discussed herein, an electrical machine that includes bonded magnets, while it displays reduced eddy current losses, likely also displays a torque production capability that is reduced over an otherwise similar electrical machine that includes sintered magnets. However, as discussed in context of FIG. 7 below, this reduction in eddy current losses that is achievable for a electrical machine that includes segmented permanent magnets arranged radially, albeit with a corresponding reduction in torque production capability, still represents an improvement over prior art surface permanent magnet electrical machines (for instance, of type 300).

In accordance with an embodiment of the invention, a HIPM electric machine (for instance, of type 400) is disclosed. The HIPM electric machine includes, a rotor (for instance, of type 402) comprising a plurality of radially placed permanent magnets (for instance, of type 404), wherein each of the radially placed permanent magnets has a proximal end (for instance, of type 432) and a distal end (for instance, of type 434), wherein each permanent magnet of the plurality of permanent magnets comprises a plurality of permanent magnetic segments (for instance, of type 406) and at least one magnetic segment towards the distal end comprises a high resistivity permanent magnetic material. The HIPM electric machine may further include a stator (for instance, of type 407), wherein a magnetic flux field (for instance, of type 458 and 459) produced within the stator due to the plurality of magnets, is bidirectional. Non-limiting examples of bidirectional nature of the magnetic flux within the stator are depicted in FIG. 5 wherein the magnetic fluxes 458 and 459 flow substantially "away" from each other as they traverse the stator.

Figure 6:
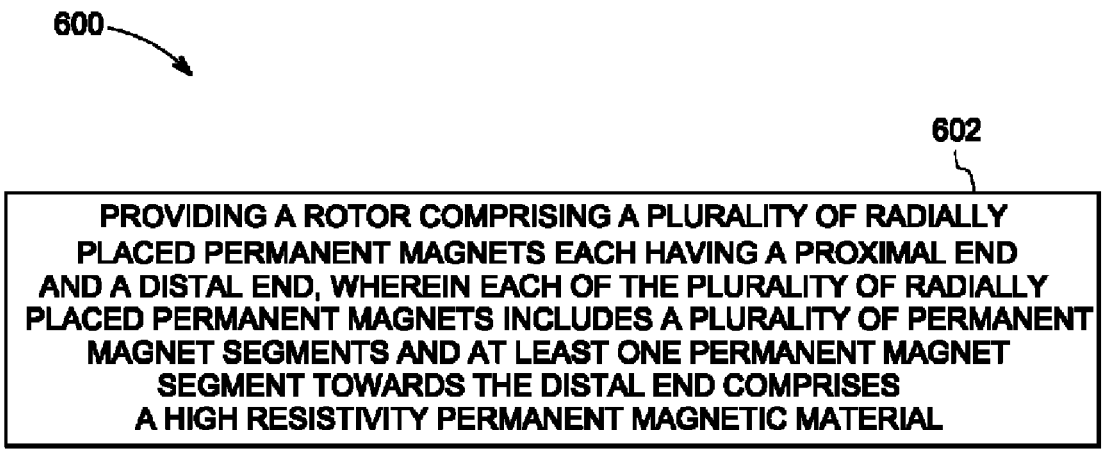
FIG. 6 is a flow chart representation of a method of making an interior permanent magnet electrical machine in accordance with one embodiment of the invention.

In accordance with one embodiment of the invention, a method 600 for making a HIPM electric machine (for instance, of type 400) is provided, as illustrated via a flow chart shown in FIG. 6. At step 602 of the method 600, a rotor (for instance, of type 402) comprising a plurality of radially placed permanent magnets (for instance, of type 404) each having a proximal (for instance, of type 432) end and a distal end (for instance, of type 434), is provided. Each of the plurality of radially placed permanent magnets includes a plurality of magnetic segments (for instance, of type 406) and at least one magnetic segment towards the distal end comprises a high resistivity permanent magnetic material. Those skilled in the art would appreciate that step 602, may more generally include providing a rotor (for instance, of type 402) comprising a plurality of radially placed magnets (for instance, of type 404) each having a proximal (for instance, of type 432) end and a distal end (for instance, of type 434).

As discussed herein, the presence of the high resistivity permanent magnet segments within any individual segmented permanent magnet (for instance, of type 442) belonging to the plurality of permanent magnets (for instance, of type 404) likely results in a change in the eddy current loss within the particular individual permanent magnet. Non-limiting examples of high resistivity permanent magnets include bonded magnets. It is remarked that, rotors (for instance, of type 402) may be designed so that any or all of the permanent magnet segments (for instance, of type 406) may be composed out of high resistivity permanent magnets. The high resistivity permanent magnets may in turn be fabricated out of any suitable known permanent magnet materials. Another important consideration is the change in the torque production capability of the electrical machine (for instance, of type 400) after any one or more permanent magnet segments have been fabricated out of high resistivity permanent magnetic materials.

As discussed herein, the inclusion of high resistivity permanent magnet segments among the plurality of permanent magnets 404, affects the torque production ability of the HIPM electrical machine 400. A knowledge of the extent of this change in torque production capability of the electrical machine 400 would ascertain the feasibility of the proposed strategy, whereby at least one of the segments 406 of the rotor 402 is composed of high resistivity permanent magnetic materials.

Figure 7:
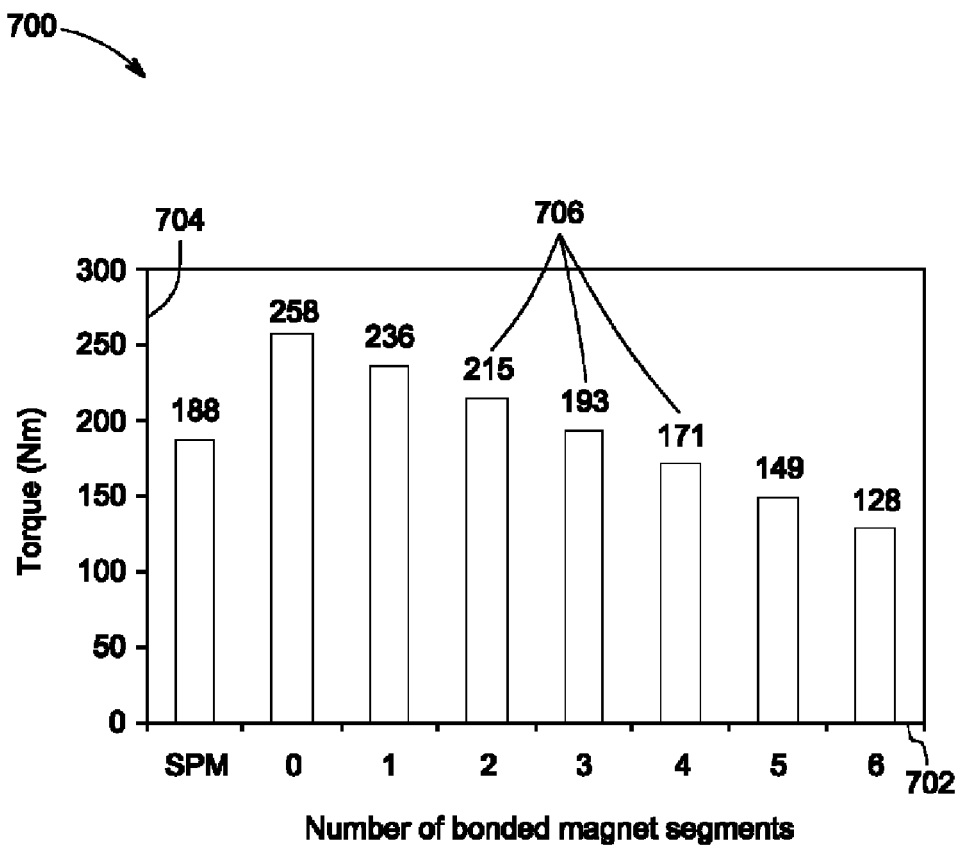
FIG. 7 is a graphical representation of a variation of torque production ability and of eddy current losses, versus a number of bonded magnet segments, in accordance with embodiments of the invention.

FIG. 7 graphically depicts the results of a finite element modeling study to estimate the torque production ability of a given electrical machine of type 400 as a function of the amount of bonded permanent magnet content within the plurality of permanent magnets 404. Specifically, the torque produced by an electric machine of type 400, that does not contain any high resistivity permanent magnet content was estimated and compared against the torque produced by HIPM electric machines of type 400 that contains differing amounts of high resistivity permanent magnet content. As a non-limiting example, the amount of high resistivity permanent magnet content within any particular permanent magnet belonging to the plurality of permanent magnets 404 may be varied by fabricating any one or more segments 406 from bonded magnets.

FIG. 7 shows in bar-chart graph form 700 the results of a finite element modeling study wherein the torque produced within different realizations of the HIPM electrical machine of type 400 (FIG. 4) was estimated. The abscissa 702 of the graph 700 represents a number of segments that contain bonded magnets starting from the segment closest to the rotor circumference 401 (FIG. 4), while the corresponding value of estimated torque production capability is plotted along the ordinate 704 of the graph 700. Each of the realizations of the permanent magnet machine 400 includes a different number of permanent magnet segments that have been fabricated out of bonded permanent magnetic materials. In other words, each realization differs in the number of bonded magnet segments that any individual permanent magnet (for instance, of type 442) of the plurality of permanent magnets (for instance, of type 404) contains. These estimates were further compared to the torque production capability of a surface permanent magnet electric machine (for instance, of type 300) wherein each of the plurality of poles (for instance, of type 302) includes segmented sintered permanent magnets. Such a data set is labeled as "SPM" for "surface permanent magnet," on the abscissa 702 of graph 700 and corresponds to a "surface permanent magnet electrical machine" of the type 300 shown in FIG. 3. As discussed earlier, these estimates were further compared to the torque production capability of a HIPM electric machine wherein each of the plurality of poles include segmented permanent magnets, which do not include any high resistivity permanent magnetic material. Such a data set corresponds to the "zero" position on the abscissa 702.

The numbers 706 listed at the top of each of the bars in FIG. 7 indicate a value of estimated torque production capability (that is, the corresponding value on the abscissa 704) of electrical machines of type 400 including a number of bonded permanent magnet segments per permanent magnet of the plurality of permanent magnets 404, as mentioned along the abscissa 702. For comparison, the value of torque production capability of an electrical machine of type 400 containing segmented surface permanent magnet (labeled "SPM" along the abscissa 702), and a segmented spoke interior permanent magnet machine that does not contain any high resistivity permanent magnetic content (corresponding to an abscissa 702 value of "zero") are also shown in FIG. 7. It may be evident that, a surface permanent magnet electrical machine of type 300 (FIG. 3) is capable of producing about 188 Newton meter (Nm) of torque, while a spoke interior permanent magnet electrical machine of type 400 wherein each of the plurality of poles 404 contains segmented magnets (which, nevertheless, do not contain any high resistivity permanent magnet material) is capable of producing an enhanced torque of about 258 Nm of torque (corresponding to an abscissa 702 value of "zero"). It is evident that there is a enhancement in the torque production capability to a value of about 258 Nm (up from about 188 Nm). The enhancement is likely due to the flux concentration effect due to the spoke configuration as has been discussed herein. The values of the eddy current losses per permanent magnet segment, as are listed in FIG. 5, table 500 column 506, correspond to such an electrical machine 400 which includes permanent magnets that do not include any high resistivity permanent magnets.

It is evident from expression (1) that if the bonded magnet segment has a resistance "N" times the resistance of the sintered magnet segment that it replaces, then the eddy current loss "E" attributable to that "segment" would come down by a factor of "N." As a non-limiting example, if the bonded magnet has a resistivity of about twenty times the resistivity of the sintered magnet (that is, N=about 20), then, according to expression (1), the eddy current loss due the particular segment would also be correspondingly reduced by a factor of about twenty. The effect on torque production ability of the electric machine 400 upon an inclusion, within the plurality of rotor poles 404, of progressively higher amount of high resistivity permanent "bonded" magnets, having a value of resistance that is, in this instance, about twenty times the sintered magnet value is now discussed.

As is evident from FIG. 7, there is a marginal drop in torque production capability to about 236 Nm (down from about 258 Nm and corresponding to an abscissa 702 value of "one"), upon the inclusion of a single bonded magnet segment. Inclusion of a second bonded magnet segment results in a further drop in torque production capability to about 215 Nm (down from about 236 Nm and corresponding to an abscissa 702 value of "two"). Inclusion of a third bonded magnet segment results in a further drop in torque production capability to about 193 Nm (down from about 215 Nm and corresponding to an abscissa 702 value of "three").

It may also be evident that, for the example considered here wherein three of the distal segments 408, 410, and 412 are replaced by high resistivity permanent bonded magnets whose resistance is about twenty times the resistance of the sintered magnets that they replace (that is, N=about 20), the value of eddy current losses are reduced to about 29 Watts (down from about 270 Watts). On the other hand, the torque production capability is also reduced to about 193 Nm (down from about 258 Nm). In other words, a decrease in eddy current losses of about 89% is achievable for an attendant loss of torque of only about 25%, and a cost equivalent only to the cost of fabricating a few (in the present instance, three) segments out of high resistivity permanent "bonded" magnets. Additionally, the invention is contemplated for utilization with future techniques and materials that aid in mitigation of eddy current losses within, and/or in enhancement of torque production capability of, an electrical machine.

In one embodiment of the invention, the high resistivity permanent magnetic material includes at least one compound including a rare earth atom. Non-limiting examples of high resistivity bonded permanent magnetic materials include NdFeB, and SmCo that have undergone suitable processing. In one embodiment of the invention, the high resistivity permanent magnetic materials may be fabricated in the form of a powder. In one embodiment of the invention, the high resistivity permanent magnetic materials are fabricated in the form of a powder that includes particles with sizes within a range from about 2 micrometer to about 10 micrometer. In one embodiment of the invention, the high resistivity permanent magnetic material has an electrical resistivity within a range from about 15 microohm meters to about 20 microohm meters.

In one embodiment of the invention, the high resistivity hard magnetic material independently includes a compounds including at least one rare earth atom. Non-limiting examples of high resistivity hard magnetic material include ferrites such as barium hexaferrites and strontium hexaferrites, and alnico that have undergone suitable processing.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. An interior permanent magnet electric machine, said machine comprising:
   a rotor having a rotor shaft center and a circumference and comprising a plurality of radially placed magnets each aligned along a ray extending from the rotor shaft center toward the rotor circumference and having a proximal end closest the rotor shaft center and a distal end closest the rotor circumference, wherein each magnet comprises a plurality of magnetic segments and wherein a magnetic segment closest the distal end comprises a bonded magnetic material having a first electrical resistivity and a magnet segment closest the proximal end comprises a sintered magnetic material having a second electrical resistivity lower than the first electrical resistivity.

2. The interior permanent magnet electric machine of claim 1, wherein the magnets establish a magnetic flux field in a circumferential direction of the rotor.

3. The interior permanent magnet electric machine of claim 1, further comprising an electrical insulation disposed between adjacent magnetic segments.

4. The interior permanent magnet electric machine of claim 1, wherein at least one of the plurality of magnets comprises a plurality of contiguous magnetic segments, each comprising a sintered magnetic material.

5. The interior permanent magnet electric machine of claim 4, wherein a magnetic segment comprising sintered magnetic material has an electrical resistivity that lies within a range from about 1.2 microohm meter to about 1.6 microohm meter.

6. The interior permanent magnet electric machine of claim 1, wherein at least one of the plurality of magnets comprises a plurality of contiguous magnetic segments, each comprising a bonded magnetic material.

7. The interior permanent magnet electric machine of claim 6, wherein a magnetic segment comprising bonded magnetic material has an electrical resistivity of up to about 20 micro ohm meter.

8. The interior permanent magnet electric machine of claim 1, wherein the machine comprises a multi-phase machine.

9. The interior permanent magnet electric machine of claim 1, wherein each of the plurality of magnets independently comprise a permanent magnetic material.

10. The interior permanent magnet electric machine of claim 9, wherein the permanent magnetic material comprises a compound comprising a rare earth atom.

11. The interior permanent electric magnet machine of claim 9, wherein the permanent magnetic material comprises neodymium iron boron or samarium cobalt.

12. An interior permanent magnet machine, said machine comprising:
a rotor having a rotor shaft center and a circumference and comprising a plurality of radially placed magnets each aligned along a ray extending from the rotor shaft center toward the rotor circumference and having a proximal end closest the rotor shaft center and a distal end closest the rotor circumference, wherein each magnet comprises a plurality of magnetic segments and wherein a magnetic segment closest the distal end comprises a bonded magnetic material having a first electrical resistivity and a magnet segment closest the proximal end comprises a sintered magnetic material having a second electrical resistivity lower than the first electrical resistivity; and
a stator, wherein a magnetic flux field produced within the stator due to the plurality of magnets, is bidirectional.

13. The interior permanent magnet electric machine of claim 12, wherein the plurality of magnets each comprise a plurality of contiguous magnetic segments comprising a sintered magnetic material.

14. The interior permanent magnet electric machine of claim 13, wherein the plurality of magnets each further comprise a plurality of contiguous magnetic segments comprising a bonded magnetic material.

15. The interior permanent magnet electric machine of claim 12, further comprising an electrical insulation disposed between adjacent magnetic segments.

* * * * *